United States Patent [19]

Cirigliano et al.

[11] Patent Number: 5,738,888
[45] Date of Patent: Apr. 14, 1998

[54] BEVERAGE PRESERVATION

[75] Inventors: Michael Charles Cirigliano, Cresskill; Raymond Thomas McKenna, Scotch Plains; Paul John Rothenberg, West Milford, all of N.J.

[73] Assignee: Thomas J. Lipton Co., Division of Conopco, Inc., Englewood Cliffs, N.J.

[21] Appl. No.: 763,593

[22] Filed: Dec. 11, 1996

Related U.S. Application Data

[60] Provisional application No. 60/020,155, Jun. 20, 1996 and provisional application No. 60/020,156, Jun. 20, 1996.

[51] Int. Cl.$^6$ .............................. A23L 2/00; A23L 2/02; A23L 2/84; A23F 3/00
[52] U.S. Cl. .............................. 426/52; 426/51; 426/590; 426/597; 426/599; 426/330.3; 426/654
[58] Field of Search ...................... 426/330.3, 51, 426/52, 597, 599, 590, 654

[56] References Cited

U.S. PATENT DOCUMENTS

| | | | |
|---|---|---|---|
| 3,232,766 | 2/1966 | Strandskov et al. | 426/330.3 |
| 3,936,269 | 2/1976 | Bayne | 21/58 |
| 3,979,524 | 9/1976 | Bayne | 426/305 |
| 4,600,706 | 7/1986 | Carter | 514/31 |
| 4,664,861 | 5/1987 | Pritikin et al. | 264/173 |
| 5,196,344 | 3/1993 | Ruttan | 436/18 |

OTHER PUBLICATIONS

J. Giese, Antimicrobials: Assuring Food Safety, Food Technology, Jun. 1994, 48, (6), pp. 101–110.
Morris and Hart, Pimaricin—What is It?, Culture Dairy Products Journal, vol. 13, p. 22, 1978.

*Primary Examiner*—Helen Pratt
*Attorney, Agent, or Firm*—James J. Farrell

[57] ABSTRACT

An aqueous based beverage is disclosed which also contains sufficient Natamycin and DMDC to prevent spoilage and the outgrowth of pathogenic microbes.

11 Claims, No Drawings

BEVERAGE PRESERVATION

CROSS-REFERENCE TO RELATED APPLICATION

This application claims the benefit of U.S. Provisional application Ser. Nos. 60/020,155, filed Jun. 20, 1996 and 60/020,156, filed Jun. 20, 1996.

BACKGROUND OF THE INVENTION

1. Field of the Invention

The present invention relates to the use of a combination of natural preservatives such as Natamycin together with DMDC in beverages including those which contain tea solids. The beverages under some conditions are subject to microbial spoilage.

2. Related Art

Natamycin, also known as pimaricin, is an antifungal agent produced by *Streptomyces natalensis*. The compound is effective against yeasts and molds and is reported to be ineffective against bacteria. It is approved for use as an additive which may be applied to the surface of cuts and slices of cheese to inhibit mold spoilage (21 CFR 172.155). This information is available from an article on "Antimicrobials: Assuring Food Safety" by J. Giese in the June 1994 Food Technology periodical 48 (6) pp. 101– 110.

Natamycin has been used in animal feeds U.S. Pat. No. 4,600,706, in sausages and sausage casings U.S. Pat. No. 4,664,861 and in mixtures with other preservatives to preserve milk U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeasts and molds, as opposed to bacteria (see Morris and Hart, "Pimaricin—What is It?", *Culture Dairy Products Journal*, Volume 13, page 22, 1978.) Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and molds may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an antiyeast activity when added to wines, and various fruit juices, such as apple juice or orange juice. (See, Morris and Hart, cited above.)

DMDC has been used as a food preservative in U.S. Pat. No. 3,936,269 and U.S. Pat. No. 3,979,524.

BRIEF DESCRIPTION OF THE INVENTION

Many preservatives are readily available for many diverse uses. Most beverages are relatively easy to stabilize. Many beverages, however, because of their delicate balance of flavors require the utmost care in selecting preservatives. A fine balance must thus be achieved in stabilizing these beverages without deleteriously affecting their flavor.

The method employs a preservative system including dimethyl-dicarbonate (DMDC) and Natamycin (pimiricin) to preserve "still", lightly carbonated, and carbonated beverages such as fruit or vegetable juices, juice containing or flavored soft drinks, ready-to-drink tea beverages, nutraceuticals or any beverage subject to yeast, mold, and/or bacterial spoilage or at risk for pathogen contamination e.g. *E. coli*, 0157:H7; *Listeria monocytogenes*; salmonella and the like in the absence of chemical preservatives, a thermal process, strict chill chain control, or other means to achieve microbial stability and/or safety. Accordingly a beverage is disclosed which contains sufficient Natamycin and DMDC to destroy and/or inhibit the growth of pathogenic microbes. Many of these beverages are acid or high acid beverages, in the pH range 2.0–4.5, and are subject to spoilage by yeast, mold and/or acid tolerant bacteria (e.g. Lactobacillus sp., Acetobacter sp., certain Enterobacteriaceae, etc.). Certain beverages like tea may, however, be formulated at higher pHs (e.g. 4.5–6.5). Thus beverages with a pH of about 2.0 to 6.5 are disclosed. DMDC, reported to be extremely effective against most of the yeast and bacteria capable of beverage spoilage but known to be much less so against mold, is used at levels ranging from 25–250 ppm with Natamycin in the 5–125 ppm range to effect stability. For example where the upper level range of DMDC described here has been found to be ineffective in controlling mold in a tea beverage, even with the addition of the chemical preservative sorbic acid at levels as high as 300 ppm, the substitution of 50 pm Natamycin for sorbic acid, stabilized the beverage. The combination, in many beverage systems, is synergistic and its effect further enhanced by the incorporation of an oxygen scavenger or antioxidant, and/or a chelating agent or through water hardness control, to sustain Natamycin activity by preventing its degradation.

The preservation technology could be used to effect microbiological stability and/or safety in "still", lightly carbonated, or carbonated, ready-to-drink beverages, such as fruit and vegetable juices, tea and herbal tea beverages, juice containing or other flavored tea beverages, soft drinks, or any other beverage distributed at ambient (or chilled temperatures) and requiring chemical preservatives, a thermal process, strict chill chain control, or other technology to prevent yeast, mold, and/or bacterial spoilage. The incorporation of the dimethyl-dicarbonate/Natamycin preservative system could achieve this while permitting an "all natural" claim, according to the current labeling convention for these agents.

The stability and ostensibly the efficacy of Natamycin, reported to be sensitive to oxidation, appears to be enhanced by the addition of an anti-oxidant or oxygen scavenger. Several of the preferred embodiments of the beverages also include ascorbic acid, a known oxygen scavenger, which contributes to this effect. Beverages containing sufficient tea solids to result in a significant antioxidant effect are disclosed.

Heavy and divalent metals are also reported to adversely affect the stability of Natamycin. The addition of a metal sequestrant or chelating agent serves to reduce or obviate this adverse affect. One preferred embodiment incorporates citric acid a natural sequestrant. This is further enhanced by the incorporation of other sequestering agents and/or by water hardness control which removes heavy metals as well as divalent metals. This negates the adverse effect of heavy metals and sustains the efficacy of the Natamycin in an "all-natural" system. Thus a beverage having a sufficient amount of a metal sequestrant to reduce the effect of solubilized metals on the Natamycin is desirable. Other sequestering agents such as EDTA and its organic and inorganic salts, e.g. sodium and the like, metaphosphoric acid salts, polyphosphoric acid salts, tartaric acid salts, and phosphoric acid may also be used to sustain system efficacy over time, where water hardness control is not absolute. The beverages disclosed are preferred when the water used to prepare the beverage is treated to reduce the water hardness to 120 ppm or less measured as calcium carbonate.

Further, the simple expedient of incorporating a concentration of Natamycin, 1.5 times or more in excess of its maximum solubility, also significantly enhanced its effect, ostensibly by providing a "preservative" reserve buffer.

Natamycin, a fermentation by-product that is a naturally derived antimicrobial thus affords an opportunity to stabilize certain tea containing beverage formulations naturally without the use of chemical preservatives.

Natamycin is a creamy white, odorless, tasteless, practically insoluble crystalline amphoteric powder. It belongs to the polyene macrolide or macrycyclic lactone group of compounds. In low concentrations, Natamycin is a potent inhibitor of fungal microorganisms.

Natamycin is relatively stable when in a dry state or when mixed with dry diluents. However, the molecule is sensitive to ultraviolet light, oxygen, or extreme pH values. It is relatively insoluble in water in which its solubility is of the order 0.005–0.010 weight/weight percent. Additionally, even in solution, Natamycin is rather unstable. Aqueous solutions of 16 mcg/ml of Natamycin became microbiologically inactive after 24 hour exposure to light. Inactivation of Natamycin by light, peroxides or oxygen proceeds at the fastest rate in solution or suspension. Natamycin is also sensitive to heavy metals, and it may lose up to 75% of its effectivity in 4–5 hours in their presence.

Natamycin is also referred to by other names, e.g. Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g. from Gist-Brocades Food Ingredients, Inc. of King of Prussia, Pa. under the trademark DELVOCID®. Further details of the antibiotic can be found in The Merck Index, Tenth Edition, 1983, published by Merck & Co., Inc., entry no. 6278, page 922.

The addition of about 5 to 125 ppm of Natamycin and about 25 to 250 ppm DMDC to beverages has been found to reduce or completely eliminate mold outgrowth in the beverage in the time frame required for commercial sale, i.e. for about 6 to 16 weeks.

The advantage of using the Natamycin and DMDC system is that it allows the reduction or elimination of chemical preservatives thereby making a microbiologically stable beverage which is also significantly more organoleptically acceptable than those containing higher levels of chemical preservatives. The use of this system also facilitates a more cost effective approach to beverage manufacture than that required under current cold filled beverage operating conditions.

DMDC or dimethyldicarbonate is a well known material for preservation. CAS Number 4525-33-1. It can be obtained from Bayer AG as Velcorin® for cold sterilization of beverages. DMDC has been shown to destroy normal yeast spoilage bacteria and some moulds. It has also been shown that many of the microbial species encountered in the production of soft drinks can be destroyed satisfactorily with DMDC. However, laboratory and field experiments have demonstrated that additional measures are necessary to commercialize the DMDC technology.

For example, preliminary experiments performed with *Saccharomyces cerevisiae* indicated that the yeast count of beverage prior to DMDC treatment should be below 500 per ml. However, field pilot studies indicate that this microbial threshold must be lower. Further, the successful use of DMDC necessarily requires that extreme vigilance be exercised in controlling microbial insult at the plant level. This would include those contaminations introduced by ingredients and by the plant environment.

As a result, beverages preserved only with DMDC usually require preliminary treatment, e.g. pasteurization, to reduce microbial counts to be effective. Additionally, a rigorous plant and equipment sanitation program is essential for the effective application of DMDC. It would therefore be most desirable to formulate a more robust beverage to preclude the need for these extreme measures.

In water and aqueous solutions (and hence in beverages) DMDC decomposes rapidly, and almost completely, to form carbon dioxide and methyl alcohol.

The rate of decomposition depends mainly on temperature, but also to a small extent on the pH of the drink in question. The half-life of DMDC in the presence of water is:

40 minutes at 10° C.

15 minutes at 20° C.

8 minutes at 30° C.

Soft drinks based on fruit juices and containing carbon dioxide can be sterilized, in some instances, with 25–250 ppm of DMDC. Smaller doses of DMDC are sufficient if the pH is low and the $CO_2$ pressure high. Uncarbonated fruit juice drinks that are more susceptible to spoilage may need larger doses of DMDC and/or a more vigorous pretreatment to reduce the microbial load prior to the addition of DMDC.

Before the DMDC is added the beverage is cooled preferably, to 10°–15° C.; this slows down the decomposition of the DMDC, thus prolonging its antimicrobial action. If the temperature of the beverage is above 15° C. the dosage is typically increased. It is probably not economical to add DMDC to beverages whose temperature exceeds 30° C.

DMDC, when added to a beverage, decomposes rapidly. It should therefore not be added until shortly before the beverage is filled into the bottles, cartons, or other containers. Once the DMDC has decomposed there is no further sterilizing effect. For the same reason there is nothing to prevent the beverage from undergoing microbial outgrowth again as soon as the container is opened.

As used herein, the term "beverage" refers to a drinkable beverage. Tea containing beverages may be prepared from tea extracts, concentrates or powder by dilution with water. Juice beverages and/or concentrates may be prepared from fruits, vegetables and other materials by obtaining the fluid or fluidizable portion of the material by any suitable means known to the art and then treating this fluid material. A beverage containing a minimum of 0.01% of edible fluidizable food material together with enough tea solids to result in a significant antioxidant effect is disclosed. This beverage contains a sufficient amount of Natamycin in combination with DMDC to prevent microbial spoilage. The food material is selected from the group consisting of vegetables, fruits, seeds, grains, herbal materials, tea and mixtures thereof. If a tea beverage is employed then a tea concentrate or powder is generally diluted with sufficient water to provide the tea beverage. Preferred tea concentrates or powders are typically diluted to a minimum of about 0.08% tea solids to provide the drinkable tea beverage but this depends on the flavor profile sought and may be 0.01 to 0.5% or even higher.

Typical beverages include an aqueous based beverage with a pH of about 2.5 to 6.5 comprising about 0.01% to 0.5% tea solids by weight and a sufficient amount of Natamycin in combination with DMDC to prevent microbial spillage. Liquid foodstuffs with a pH of 2.0 to 6.5 including an aqueous tea infusion having 0.06% to 0.2% tea solids, about 5–125 ppm of Natamycin and about 25 ppm to 250 ppm of DMDC are also disclosed.

All parts and proportions herein and in the appended claims are by weight unless otherwise indicated.

A series of tests using Natamycin and DMDC at varying levels, in water of varying hardness and also at varying inoculation levels of yeast were run. The tests were run on selected beverages representative of commercial ready-to-drink tea beverages. The pH in some cases was varied.

The tea beverages prepared for testing with the preservative of the invention were as follows:

Beverage A

This contained the following ingredients:

| | | |
|---|---|---|
| K Sorbate | .03% | |
| Ascorbic Acid | .01% | |
| Tea Powder | .1% | |
| Color Component | .02% | |
| Tea Aroma | .1% | |
| Tea Flavor | .08% | |
| Natamycin (Delvocid 50% Natamycin) | .01% | (50 ppm Natamycin) |
| Water balance to | 100% | |
| pH adjusted to 4.0 with 85% phosphoric acid. | | |

Beverage B

This contained the following ingredients:

| | | |
|---|---|---|
| DMDC | .023% | (230 ppm DMDC) |
| Ascorbic Acid | .01% | |
| K Sorbate | .03% | |
| Tea Powder | .1% | |
| Natamycin (Delvocid 50% Natamycin) | .01% | (50 ppm Natamycin) |
| Color Component | .02% | |
| Tea Aroma | .1% | |
| Tea Flavor | .08% | |
| Water balance to | 100% | |
| pH adjusted to 4.0 with 85% phosphoric acid. | | |

Beverage C

| | | |
|---|---|---|
| DMDC | .023% | (230 ppm DMDC) |
| Ascorbic Acid | .01% | |
| Tea Powder | .1% | |
| Tea Aroma | .1% | |
| Tea Flavor | .08% | |
| Color Component | .02% | |
| Natamycin (Delvocid 50% Natamycin) | .01% | (50 ppm Natamycin) |
| Water balance to | 100% | |
| pH adjusted to 4.0 with 85% phosphoric acid. | | |

Beverage D

| | | |
|---|---|---|
| DMDC | .023% | (230 ppm DMDC) |
| Ascorbic Acid | .01% | |
| K Sorbate | .03% | |
| Tea Powder | .1% | |
| Color Component | .02% | |
| Tea Aroma | .1% | |
| Tea Flavor | .08% | |
| Water balance to | 100% | |
| pH adjusted to 4.0 with 85% phosphoric acid. | | |

Beverage E

| | |
|---|---|
| K Sorbate | .04% |
| Ascorbic Acid | .01% |
| Tea Powder | .1% |
| Color Component | .02% |
| Tea Aroma | .1% |
| Tea Flavor | .08% |
| HFCS (High Fructose Corn Syrup) | 8% |
| Natamycin (Delvocid 50% Natamycin) | .01% |
| Water balance to | 100% |
| pH adjusted 4.0 with 85% phosphoric acid. | |

Beverage F

This beverage contains:

| | | |
|---|---|---|
| DMDC | .023% | (230 ppm DMDC) |
| Ascorbic Acid | .01% | |
| K Sorbate | .04% | |
| Tea Powder | .1% | |
| Tea Aroma | .1% | |
| Color Component | .02% | |
| Tea Flavor | .08% | |
| HFCS 10 | 8% | |
| Natamycin (Delvocid 50% Natamycin) | .01% | (50 ppm Natamycin) |
| Water balance to | 100% | |
| pH adjusted 4.0 with 85% phosphoric acid. | | |

Beverage G

| | | |
|---|---|---|
| DMDC | .023% | (230 ppm DMDC) |
| Ascorbic Acid | .01% | |
| Tea Powder | .1% | |
| Tea Aroma | .1% | |
| Color Component | .02% | |
| Tea Flavor | .08% | |
| HFCS | 8% | |
| Natamycin (Delvocid 50% Natamycin) | .01% | (50 ppm Natamycin) |
| Water balance to | 100% | |
| pH adjusted 4.0 with 85% phosphoric acid. | | |

Beverage H

| | | |
|---|---|---|
| DMDC | .023% | (230 ppm DMDC) |
| Ascorbic Acid | .01% | |
| K Sorbate | .04% | |
| Tea Powder | .1% | |
| Tea Aroma | .1% | |
| Color Component | .02% | |
| Tea Flavor | .08% | |
| HFCS | 8% | |
| Water balance to | 100% | |
| pH adjusted 4.0 with 85% phosphoric acid. | | |

EXAMPLE 1 (Table 1)

A series of tests were run on a non-sweetened tea beverage, at pH 4.0, treated with one of the following combination of preservatives: Natamycin and potassium sorbate (Beverage A); Natamycin, potassium sorbate and DMDC (Beverage B); Natamycin and DMDC (Beverage C); potassium sorbate and DMDC (Beverage D). The hardness of the beverage make-up water was 103 ppm as $Ca(CO_3)$. The amount of Natamycin used was 50 ppm. The amount of potassium sorbate used was 300 ppm. The amount of DMDC used was 230 ppm.

SUMMARY OF TIME TO YEAST SPOILAGE EXPRESSED AS # OF BOTTLES SPOILED PER WEEK

TABLE 1

| Actual Elapsed Time (Weeks) | 0 | 5 | 6 | 7 | 15 | 16 | Total Units Tested |
|---|---|---|---|---|---|---|---|
| BEVERAGE A | | | | | | | |
| NAT50; K Sorbate 300; High | 0 | 0 | 0 | 0 | 0 | 0 | 38 |
| NAT50; K Sorbate 300; Med | 0 | 0 | 0 | 0 | 0 | 0 | 37 |
| NAT50; K Sorbate 300; Low | 0 | 0 | 0 | 0 | 0 | 0 | 38 |
| BEVERAGE B | | | | | | | |
| DMDC 230; NAT50; K Sorbate 300; High | 0 | 0 | 0 | 0 | 0 | 0 | 37 |
| DMDC 230; NAT50; K Sorbate 300; Med | 0 | 0 | 0 | 0 | 0 | 0 | 36 |
| DMDC 230; NAT50; K Sorbate 300; Low | 0 | 0 | 0 | 0 | 0 | 0 | 36 |
| BEVERAGE C | | | | | | | |
| DMDC 230; NAT 50; High | 0 | 0 | 0 | 0 | 0 | 0 | 36 |
| DMDC 230; NAT 50; Med | 0 | 0 | 0 | 0 | 0 | 0 | 36 |
| DMDC 230; NAT 50; Low | 0 | 0 | 0 | 0 | 0 | 0 | 36 |
| BEVERAGE D | | | | | | | |
| DMDC 230; K Sorbate 300; High | 0 | 0 | 0 | 0 | 0 | 0 | 37 |
| DMDC 230; K Sorbate 300; Med | 0 | 0 | 0 | 0 | 0 | 0 | 37 |
| DMDC 230; K Sorbate 300; Low | 0 | 0 | 0 | 0 | 0 | 0 | 37 |

DMDC = Dimethyl-dicarbonate
NAT = Natamycin
High = 100 yeast cells/ml inoculation
Med = 10 yeast cells/ml inoculation
Low = 1 yeast cells/ml inoculation The results reported in Table 1 indicate that the same stability can be achieved in an unsweetened tea beverage at pH 4.0 using the natural DMDC/Natamycin combination as can be achieved with the chemical DMDC/potassium sorbate combination with the advantage that the flavor profile of the tea using the natural combination is significantly improved.

EXAMPLE 2 (Table 2)

A series of tests were run on a sweetened tea beverage, at pH 4.0, treated with one of the following combinations of preservatives: Natamycin and potassium sorbate (Beverage E); Natamycin, potassium sorbate and DMDC (Beverage F); Natamycin and DMDC (Beverage G); potassium sorbate and DMDC (Beverage H). The hardness of the beverage make-up water was 103 ppm as $Ca(CO_3)$. The amount of Natamycin used was 50 ppm. The amount of potassium sorbate used was 400 ppm. The amount of DMDC used was 230 ppm.

SUMMARY OF TIME TO YEAST SPOILAGE EXPRESSED AS # OF BOTTLES SPOILED PER WEEK

TABLE 2

| Elapsed Time (Weeks): | 0 | 5 | 6 | 7 | 16 | TOTAL UNITS TESTED |
|---|---|---|---|---|---|---|
| BEVERAGE E | | | | | | |
| NAT50; K Sorbate 400; High | 0 | 0 | 0 | 0 | 0 | 37 |
| NAT50; K Sorbate 400; Med | 0 | 0 | 0 | 0 | 0 | 37 |
| NAT50; K Sorbate 400; Low | 0 | 0 | 0 | 0 | 0 | 37 |
| BEVERAGE F | | | | | | |
| NAT50; K Sorbate 400; High | 0 | 0 | 0 | 0 | 0 | 37 |
| DMDC 230; NAT50; K Sorbate 400; Med | 0 | 0 | 0 | 0 | 0 | 37 |
| DMDC 230; NAT50; K Sorbate 400; Low | 0 | 0 | 0 | 0 | 0 | 37 |
| BEVERAGE G | | | | | | |
| DMDC 230; NAT50; High | 0 | 0 | 0 | 0 | 0 | 37 |
| DMDC 230; NAT50; Med | 0 | 0 | 0 | 0 | 0 | 37 |
| DMDC 230; NAT50; Low | 0 | 0 | 0 | 0 | 0 | 37 |
| BEVERAGE H | | | | | | |
| DMDC 230; K Sorbate 400; High | 0 | 4 | 0 | 0 | 0 | 36 |
| DMDC 230; K Sorbate 400; Med | 0 | 1 | 0 | 0 | 0 | 38 |
| DMDC 230; K Sorbate 400; Low | 0 | 1 | 0 | 0 | 0 | 38 |

DMDC = Dimethyl-dicarbonate
NAT = Natamycin
K Sorbate = Potassium Sorbate
High = 100 yeast cells/ml inoculation
Med = 10 yeast cells/ml inoculation
Low = 1 yeast cells/ml inoculation The results reported in Table 2 show that the sweetened tea beverage containing Natamycin and DMDC, at pH 4.0, not only has the benefit of a significantly better tasting, all natural, preservative system but also increased microbiological stability.

Although the invention has been described in detail with respect to preferred embodiments thereof, variations and modifications will be readily apparent to those skilled in the art without departing from the spirit and scope of the inventions as set forth in the claims.

What is claimed is:

1. An aqueous based beverage containing a minimum of 0.01% of edible fluidizable food material and a sufficient mount of Natamycin in combination with DMDC to prevent microbial spoilage, said beverage having a pH of about 2.0 to 6.5 and further comprising sufficient tea solids to result in a significant antioxidant effect.

2. A beverage as defined in claim 1 wherein said food material is selected from the group consisting of vegetables, fruits, seeds, grains, herbal materials, tea and mixtures thereof.

3. A beverage as defined in claim 1 wherein said Natamycin is present in an amount of at least about 5 to 125 ppm and said DMDC is present in an amount of about 25 to 250 ppm.

4. A beverage as defined in claim 1 having sufficient Natamycin and DMDC to delay or completely inhibit outgrowth of yeast and/or mold.

5. A beverage as defined in claim 1 containing a sufficient amount of Natamycin and DMDC to destroy and/or inhibit the growth of pathogenic microbes.

6. A beverage as defined in claim 1 further comprising an antioxidant or oxygen scavenger.

7. A beverage as defined in claim 1 wherein said Natamycin is present in an amount of 1.5 times the maximum solubility of said Natamycin in the beverage.

8. A beverage as defined in claim 1 wherein a metal sequestrant is present in an amount sufficient to reduce the effect of solubilized metals on the Natamycin.

9. A beverage as defined in claim 1 wherein the water used to prepare the beverage is treated to reduce the water hardness to a level of 120 ppm or less measured as calcium carbonate.

10. An aqueous based beverage comprising about 0.01% to 0.5% tea solids by weight and a sufficient amount of Natamycin in combination with DMDC to prevent microbial spoilage, said beverage having a pH of about 2.5 to 6.5.

11. A liquid foodstuff including an aqueous tea infusion having 0.06 to 0.2% tea solids having a pH of 2.0 to 6.5, about 5–125 ppm of Natamycin and about 25 ppm to 250 ppm of DMDC.

* * * * *